US008813595B2

(12) United States Patent
Kawakatsu et al.

(10) Patent No.: US 8,813,595 B2
(45) Date of Patent: Aug. 26, 2014

(54) METHOD FOR ADJUSTING MESHING POSITION OF HYPOID GEAR

(75) Inventors: Tsutomu Kawakatsu, Utsunomiya (JP); Yasuo Takeuchi, Chikusei (JP); Hideki Komaba, Utsunomiya (JP); Yutaka Yoshiba, Minato-ku (JP); Norikazu Hashimoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1140 days.

(21) Appl. No.: 12/742,824

(22) PCT Filed: Nov. 12, 2008

(86) PCT No.: PCT/JP2008/070580
§ 371 (c)(1),
(2), (4) Date: May 13, 2010

(87) PCT Pub. No.: WO2009/063898
PCT Pub. Date: May 22, 2009

(65) Prior Publication Data
US 2010/0263466 A1    Oct. 21, 2010

(30) Foreign Application Priority Data
Nov. 14, 2007   (JP) ................................ 2007-295273

(51) Int. Cl.
*F16H 35/06*   (2006.01)
*F16H 1/14*    (2006.01)
*G01M 13/02*   (2006.01)
*F16H 55/20*   (2006.01)
*F16H 57/022*  (2012.01)

(52) U.S. Cl.
CPC ................ *F16H 1/145* (2013.01); *F16H 55/20* (2013.01); *G01M 13/021* (2013.01); *F16H 2057/0221* (2013.01); *F16H 57/022* (2013.01)
USPC .............................................. 74/395; 73/162

(58) Field of Classification Search
USPC ......... 74/395; 73/162; 33/501.13, 501.7, 613, 33/626; 451/47
See application file for complete search history.

(56) References Cited

U.S. PATENT DOCUMENTS 3,715,909 A * 2/1973 Wolanin ............................. 73/9
4,831,872 A * 5/1989 Huang et al. .................... 73/162

(Continued)

FOREIGN PATENT DOCUMENTS

JP    04-016329    2/1992
JP    08-005517    1/1996

(Continued)

*Primary Examiner* — Troy Chambers
*Assistant Examiner* — Zakaria Elahmadi
(74) *Attorney, Agent, or Firm* — Squire Patton Boggs (US) LLP

(57) ABSTRACT

A method for adjusting the meshing position of a hypoid gear having a first gear, and a second gear meshing with the first gear and transmitting the rotary motion thereof in the direction different from the extending direction of the axis of rotation of the first gear. The method for adjusting the meshing position comprises; a) a step for displacing the second gear a plurality of times along the axial direction of rotation while meshing with the first gear, b) a step for measuring the transmission error at each displacement position and plotting the relation of the displacement distance of the second gear and the measured transmission error, c) a step for evaluating the virtual transmission error between the measured transmission errors from the measured transmission error, d) a step for subtracting the measured transmission error and the virtual transmission error from a maximum allowable transmission error to determine the difference, e) a step for determining the area of a part surrounded by the difference and the maximum allowable transmission error by integrating the difference with the displacement distance of the second gear, and f) a step for dividing the part at a predetermined area ratio and setting a point where the division line intersects the displacement distance of the second gear at the meshing position of the second gear.

3 Claims, 5 Drawing Sheets

(56) References Cited

U.S. PATENT DOCUMENTS

| | | | |
|---|---|---|---|
| 4,931,949 A * | 6/1990 | Hernandez et al. | 702/35 |
| 5,511,414 A * | 4/1996 | Nakamura et al. | 73/162 |
| 5,823,857 A * | 10/1998 | Tan | 451/47 |
| 5,901,454 A * | 5/1999 | Stadtfeld et al. | 33/501.13 |
| 6,146,253 A * | 11/2000 | Litvin et al. | 451/47 |
| 6,481,508 B2 * | 11/2002 | McGlasson et al. | 173/211 |
| 6,655,205 B2 * | 12/2003 | Bartelt et al. | 73/162 |
| 6,918,181 B2 * | 7/2005 | Vinayak et al. | 29/893.35 |
| 6,931,316 B2 * | 8/2005 | Joe et al. | 701/61 |
| 7,104,870 B2 * | 9/2006 | Fong et al. | 451/41 |
| 7,140,252 B2 * | 11/2006 | Hamidieh et al. | 73/593 |
| 7,651,383 B2 * | 1/2010 | Stadtfeld | 451/5 |

FOREIGN PATENT DOCUMENTS

| | | |
|---|---|---|
| JP | 2001-514088 | 9/2001 |
| JP | 2002-310266 | 10/2002 |
| JP | 2005-221347 | 8/2005 |
| JP | 2007-155451 | 6/2007 |

* cited by examiner

METHOD FOR ADJUSTING MESHING POSITION OF HYPOID GEAR

TECHNICAL FIELD

The present invention relates to a method of adjusting the meshing position of a hypoid gear including a first gear and a second gear which meshes with the first gear for transmitting the rotary motion of the first gear in a direction which is different from the direction along which the rotational shaft of the first gear extends.

BACKGROUND ART

A hypoid gear includes a first gear and a second gear that are held in mesh with each other. The first gear and the second gear comprise helical bevel gears, for example, and are held in mesh with each other such that their rotational shafts are offset from each other. Since the first gear and the second gear are held in mesh with each other, the rotary motion of the first gear can be transmitted to the second gear.

The hypoid gear produces gear noise due to a mesh-dependent transmission error. According to Patent Document 1, it has been proposed to measure transmission errors at various assembled positions (meshing positions) of the second gear and select a position with the minimum transmission error as the meshing position in order to reduce the gear noise.

Patent Document 1: Japanese Laid-Open Patent Publication No. 2002-310266

DISCLOSURE OF THE INVENTION

The above method of adjusting the meshing position is disadvantageous in that since no transmission error is measured at any positions where the second gear is not assembled, the accurate meshing position cannot be identified unless the second gear is assembled at a position where the transmission error is truly minimum.

Another problem has been pointed out that when a hypoid gear is installed on an automotive body or the like and a torque is imposed thereon, the first gear and the second gear may be positionally displaced relatively to each other due to rigidity shortage of the gear case which houses the hypoid gear therein, resulting in a large transmission error.

It is a general object of the present invention to provide a method of adjusting the meshing position of a hypoid gear for easily reducing gear noise.

A major object of the present invention is to provide a method of adjusting the meshing position of a hypoid gear for avoiding a large transmission error when the hypoid gear is in actual use.

According to an aspect of the present invention, there is provided a method of adjusting a meshing position of a hypoid gear including a first gear and a second gear which meshes with the first gear for transmitting the rotary motion of the first gear in a direction which is different from the direction along which the rotational shaft of the first gear extends, comprising the steps of:

displacing the second gear along the direction of the rotational shaft of the second gear a plurality of times while the second gear is being held in mesh with the first gear;

measuring transmission errors at respective positions to which the second gear is displaced and plotting the relationship between distances by which the second gear is displaced and the measured transmission errors;

evaluating hypothetical transmission errors between the measured transmission errors from the measured transmission errors;

subtracting the measured transmission errors and the hypothetical transmission errors from a maximum allowable transmission error to determine differences therebetween;

integrating the differences with respect to the distances by which the second gear is displaced, to determine the area of a region surrounded by the differences and the maximum allowable transmission error; and dividing the region with a dividing line at a given area ratio and establishing a point of intersection between the dividing line and the distances by which the second gear is displaced as a meshing position of the second gear.

By following the above process, it is possible to establish a more appropriate meshing position than to determine a meshing position where the first gear and the second gear mesh with each other based on only measured transmission errors according to the background art. Specifically, according to the present invention, the meshing position is established also in view of the hypothetical transmission errors in addition to the measured transmission errors. Consequently, gear noise is reduced. The above steps can be carried out by an arithmetic circuit, for example.

According to the present invention, as described above, in order to determine a meshing position, not only the measured transmission errors are used, but also the intervals between the measured transmission errors are interpolated with the hypothetical transmission errors. Therefore, it is possible to establish a more appropriate meshing position than to establish a meshing position based on only measured transmission errors. Consequently, gear noise is reduced.

Preferably, points of intersection between dividing lines with which the region is divided at various area ratios and the distances by which the second gear is displaced, are regarded as meshing positions of the second gear to set up a plurality of hypoid gears, the hypoid gears are judged for acceptance percentages, and the area ratio for an acceptance percentage of 90% or higher is determined and regarded as the given area ratio to establish the meshing position of the second gear. It is thus possible to establish a much more appropriate meshing position with ease.

Particularly, the area ratio for the acceptance percentage of 90% or higher is preferably determined while the hypoid gear is in actual usage conditions. Since the hypoid gear is evaluated in actual usage conditions, it is possible to establish the meshing position on the assumption that the first gear and the second gear are positionally displaced with respect to each other, for example. Therefore, it is possible to avoid a large transmission error when hypoid gears 10 of the same type are in actual use.

BEST MODE FOR CARRYING OUT THE INVENTION

A method of adjusting the meshing position of a hypoid gear according to a preferred embodiment of the present invention will be described in detail below with reference to the accompanying drawings.

Figure 1:
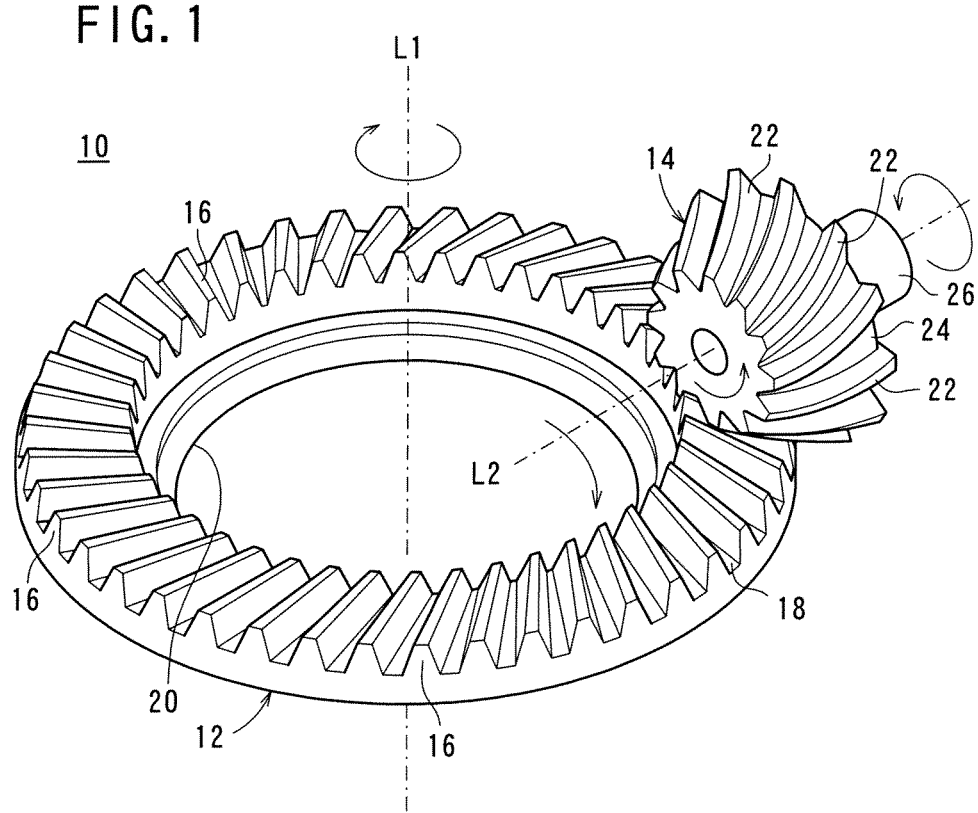
FIG. 1 is a schematic structural view of main parts of a hypoid gear.

FIG. 1 is a schematic structural view of main parts of a hypoid gear 10. In this case, the hypoid gear 10 comprises a first gear 12 and a second gear 14 which is smaller in diameter than the first gear 12. In this case, the first gear 12 and the second gear 14 comprise spiral bevel gears.

The first gear 12 has an annular beveled portion 18 with teeth 16 disposed on a surface thereof. The beveled portion 18 has a through hole 20 defined therein, and a rotational shaft, not shown, is fitted in the through hole 20. The first gear 12 is rotatable about the rotational shaft (a hypothetical axis L1 in FIG. 1).

The second gear 14 has a beveled portion 24 with teeth 22 disposed thereon and a cylindrical shank 26 projecting from an end face of the beveled portion 24. The teeth 22 are held in mesh with the teeth 16 of the first gear 12.

A driven shaft, not shown, is coupled to the shank 26 of the second gear 14. The driven shaft is rotatable about the center of rotation of the shank 26 of the second gear 14 (a hypothetical axis L2 in FIG. 1). The rotary motion of the first gear 12 changes its direction from the hypothetical axis L1 to the hypothetical axis L2 via the second gear 14. The hypothetical axis L1 and the hypothetical axis L2 are offset from each other. Specifically, the hypothetical axis L2 is perpendicular to a hypothetical axis which extends parallel to the hypothetical axis L1.

The meshing position of the second gear 14 of the hypoid gear 10 thus constructed is established as follows:

First, the second gear 14 is maximally displaced along the hypothetical axis L2 toward the through hole 20 of the first gear 12 and the teeth 16, 22 are brought into mesh with each other. In the position where the teeth 16, 22 are held in mesh with each other, the second gear 14 is rotatable in response to the rotary motion of the first gear 12.

Then, the first gear 12 is rotated about the hypothetical axis L1. The second gear 14 now rotates about the hypothetical axis L2 in response to the rotary motion of the first gear 12. At this time, a transmission error is measured and the measured value (measured transmission error) is input to an arithmetic circuit.

Figure 2A:
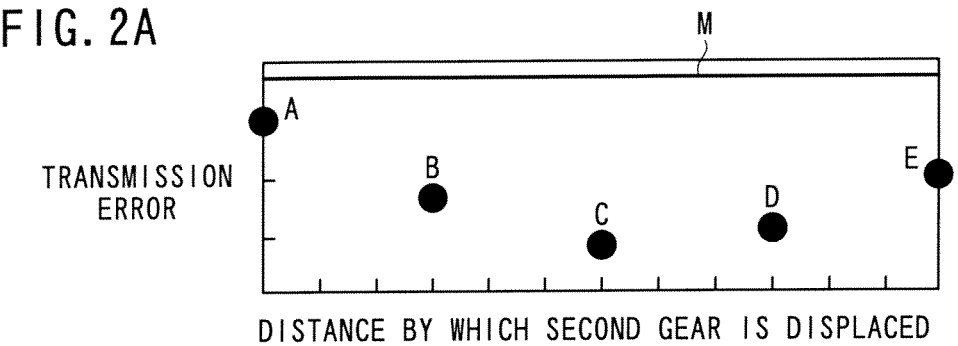
FIGS. 2A through 2C are diagrams showing graphs illustrative of a process of evaluating a hypothetical transmission error based on a measured transmission error of a hypoid gear of a certain type and determining the area of a region surrounded by a transmission error curve and the maximum allowable value for transmission errors.

An arithmetic operation of the arithmetic circuit will be described with reference to graphs. As shown in FIG. 2A, the arithmetic circuit generates a graph having a horizontal axis representative of meshing positions of the second gear 14 and a vertical axis representative of transmission errors, with the measured transmission error being plotted on the graph. The plotted measured transmission error is indicated by a black spot A in FIG. 2A. A straight line M extending parallel to the horizontal axis of FIG. 2A represents a maximum allowable value for transmission errors.

Then, the second gear 14 is slightly displaced along the hypothetical axis L2 away from the through hole 20 of the first gear 12, while keeping the teeth 16, 22 in mesh with each other. The first gear 12 is rotated, thereby rotating the second gear 14. The arithmetic circuit then plots a transmission error measured at this time as a spot B in FIG. 2A.

The above process is repeated by slightly displacing the second gear 14 along the hypothetical axis L2 away from the through hole 20 of the first gear 12 until a position is reached where the teeth 22 of the second gear 14 do not disengage from the teeth 16 of the first gear 12 and the second gear 14 remains rotatable. The measured results from the repeated process are plotted as spots C, D, E in FIG. 2A.

Figure 2B:
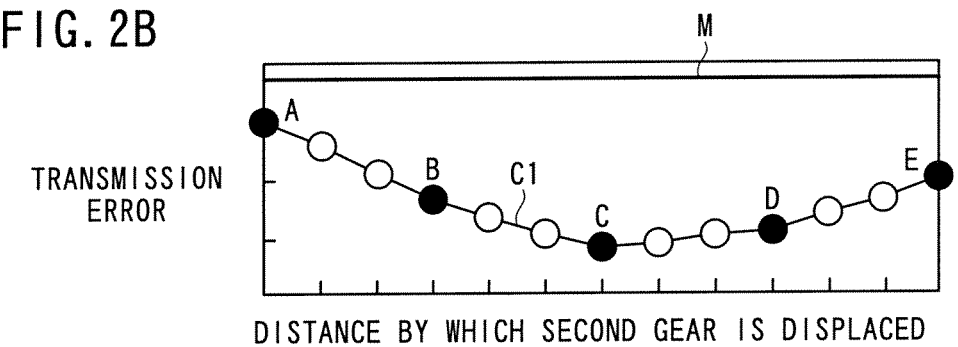

Then, transmission errors between the spots A, B, between the spots B, C, between the spots C, D, and between the spots D, E are evaluated from the measured transmission errors. Specifically, the intervals between the measured transmission errors are interpolated. The interpolated data are plotted as white dots in FIG. 2B. The evaluated transmission errors will hereinafter be referred to as hypothetical transmission errors, and a curve C1 formed by interconnecting the measured transmission errors and the hypothetical transmission errors will be referred to as a transmission error curve.

Then, the coordinates along the vertical axis of the measured transmission errors and the hypothetical transmission errors are subtracted from the maximum allowable value for the transmission errors (the coordinates along the vertical axis of the straight line M), determining differences therebetween. The differences are integrated with respect to the distances by which the second gear 14 is displaced, thereby determining the area of a region that is surrounded between the transmission error curve and the straight line M (the maximum allowable value for the transmission errors), as shown in FIG. 2C.

Then, the region is divided to attain a certain area ratio.

The certain area ratio is different for different structures of the hypoid gear 10, e.g., different dimensions of the first gear 12 and the second gear 14. According to the present embodiment, the hypoid gear 10 is operated in actual usage conditions. Specifically, if the hypoid gear 10 is to be installed on an automotive body, then the hypoid gear 10 is operated while housed in a gear case and installed on an automotive body, and under such a condition, the measurement of transmission errors is made.

Figure 2C:
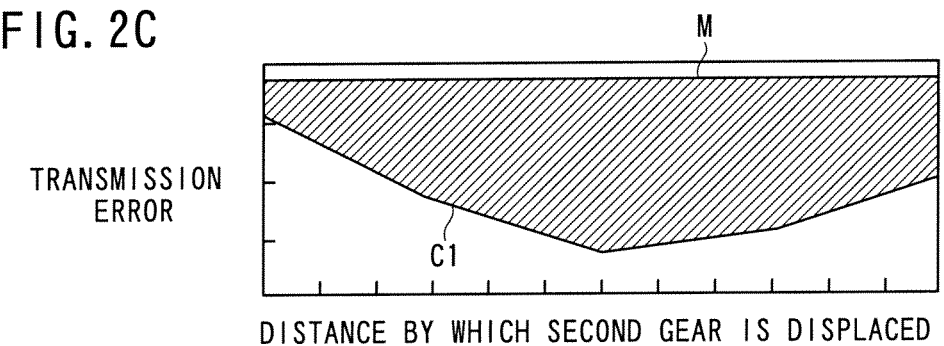
Figure 3:
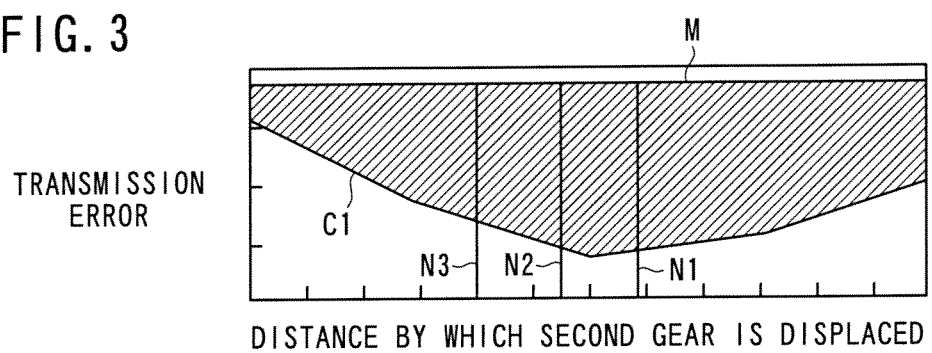
FIG. 3 is a diagram showing dividing lines drawn for diving a region shown hatched in FIG. 2C at given area ratios.

First, the region that is shown hatched in FIG. 2C is divided by a dividing line N1 drawn from the straight line M perpendicularly to the horizontal axis, as shown in FIG. 3. At this time, the dividing line N1 may be drawn at a position where the sections produced by dividing the region with the dividing line N1 have an area ratio of 50:50, for example. The coordinate along the horizontal axis of a point of intersection between the dividing line N1 and the horizontal axis is regarded as indicating the distance by which the second gear 14 is displaced, or stated otherwise, as indicating the meshing position where the first gear 12 and the second gear 14 mesh with each other, and the hypoid gear 10 is set up with the meshing position.

Then, the hypoid gear 10 thus set up is operated and measured for a transmission error, after which an acceptance percentage of the hypoid gear 10 is determined. If the acceptance percentage is below 90%, then a dividing line N2 is drawn at a position where the sections produced by dividing the region, shown hatched in FIG. 3, with the dividing line N2 have an area ratio of 60:40. Then, the coordinate along the horizontal axis of a point of intersection between the dividing line N2 and the horizontal axis is regarded as indicating the meshing position where the first gear 12 and the second gear 14 mesh with each other, and the hypoid gear 10 is set up with the meshing position. The hypoid gear 10 thus set up is operated and measured, and an acceptance percentage of the hypoid gear 10 is determined in the same manner as described above.

The above inspecting process is repeated until finally the meshing position with the acceptance percentage of 90% or higher is determined. The inventor of the present invention has confirmed that a hypoid gear 10 of a certain type has an acceptance percentage of 95% when the hatched region is divided for the area ratio of 60:40, and an acceptance percentage of 100% when the hatched region is divided by a dividing line N3 shown in FIG. 3 for the area ratio of 70:30. Though the coordinate along the horizontal axis of a point of intersection between the dividing line N2 and the horizontal axis may be regarded as the meshing position, it is more preferable that the coordinate along the horizontal axis of a point of intersection between the dividing line N3 and the horizontal axis be regarded as the meshing position.

After a preferable area ratio, or stated otherwise, a meshing position where the first gear 12 and the second gear 14 mesh with each other, has been confirmed with respect to a hypoid gear 10 of a certain structure as described above, meshing positions for hypoid gears 10 of the same structure may be the same as the confirmed meshing position where the first gear 12 and the second gear 14 mesh with each other. In other words, once an appropriate meshing position has been confirmed, there is no need to determine an appropriate meshing position again for hypoid gears 10 of the same structure.

According to the present embodiment, as described above, the hypoid gear 10 is in actual usage conditions. Therefore, when the hypoid gear 10 is installed on an automotive body, the first gear 12 and the second gear 14 are considered to be positionally displaced with respect to each other, and an acceptance percentage is determined under such a condition. In other words, according to the present embodiment, a meshing position is established on the assumption that the first gear 12 and the second gear 14 are positionally displaced with respect to each other.

Consequently, by establishing the meshing position where the first gear 12 and the second gear 14 mesh with each other for hypoid gears 10 of the same structure based on the above acceptance percentage, it is possible to avoid a large transmission error when the hypoid gears 10 are in actual use.

As shown in FIGS. 2A through 2C and 3, the most appropriate meshing position can be determined by interpolating the intervals between the measured transmission errors with the hypothetical transmission errors and dividing the area of the hatched region. As the transmission error is reduced, therefore, gear noise is reduced.

Figure 4A:
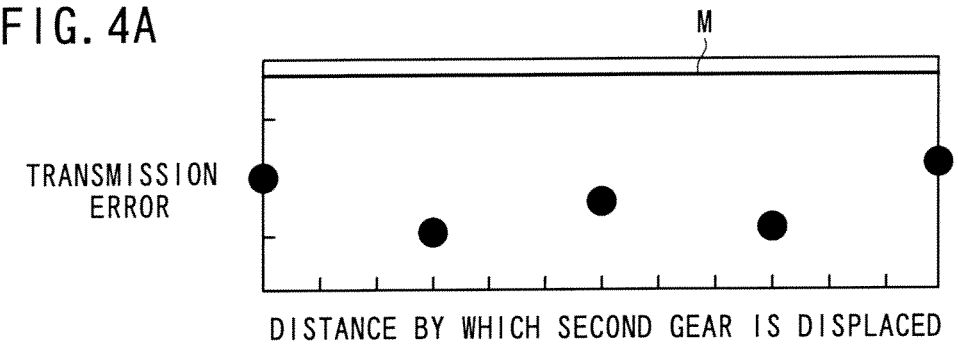
FIGS. 4A through 4D are diagrams showing graphs illustrative of a process of evaluating a hypothetical transmission error based on a measured transmission error of a hypoid gear of another type, determining the area of a region surrounded by a transmission error curve and the maximum allowable value for transmission errors, and drawing a dividing line for dividing the region at an area ratio with an acceptance percentage of 100%.
Figure 4B:
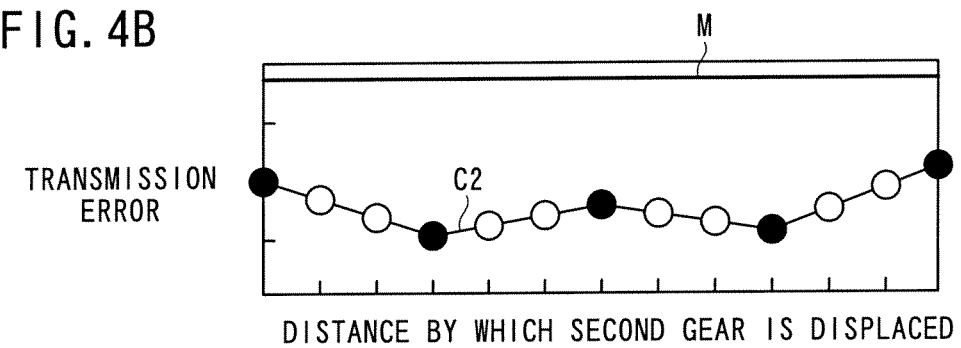
Figure 4C:
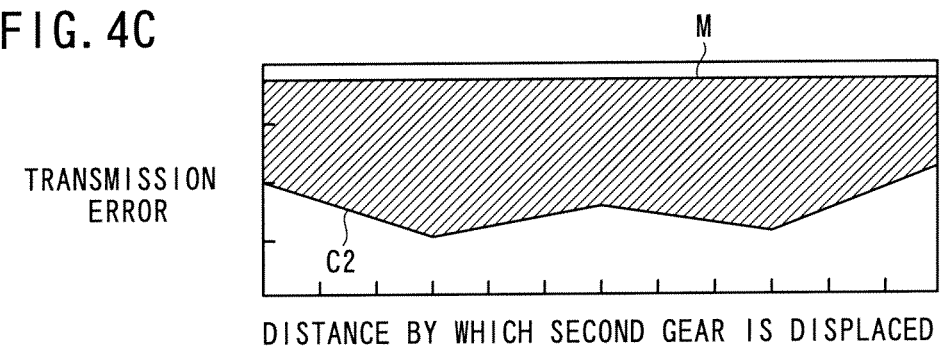

FIG. 4A shows transmission errors measured similarly at points to which the second gear 14 of a hypoid gear of another type is displaced. As shown in FIG. 4B, hypothetical transmission errors are evaluated as indicated by white spots. Then, the area of a region surrounded by a transmission error curve C2 and the straight line M (the maximum allowable value for the transmission errors) is determined, as shown in FIG. 4C.

Figure 4D:
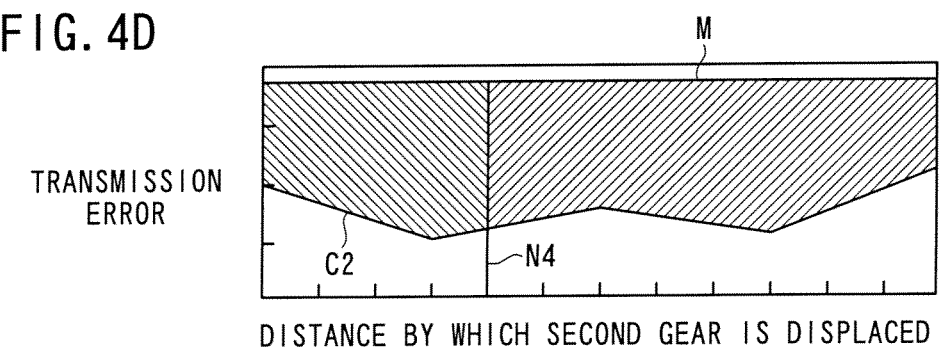

Then, in the same manner as described above, various dividing lines are drawn from the straight line M to the horizontal axis to divide the region at certain area ratios, and hypoid gears are set up with the coordinates along the horizontal axis of the points of intersection between the dividing lines and the horizontal axis being regarded as indicating the meshing positions where the first gear 12 and the second gear 14 mesh with each other. Subsequently, acceptance percentages of the hypoid gears thus set up are determined. In FIG. 4D, a dividing line N4 is drawn at the meshing position for an acceptance percentage of 100%, and the area ratio of the sections produced with the dividing line N4 is 70:30.

Figure 5A:
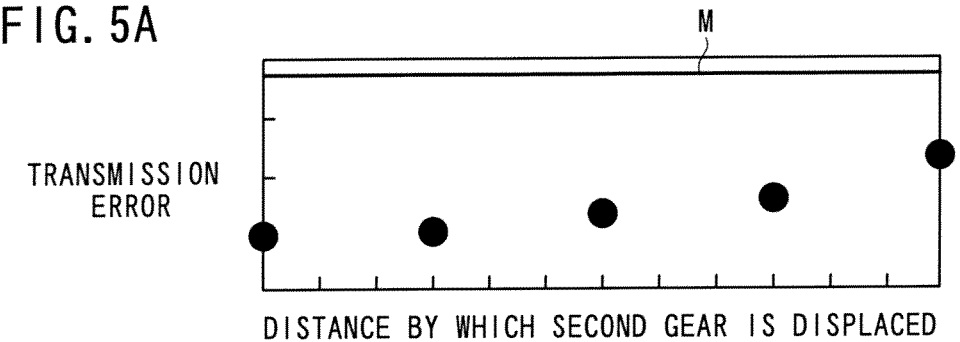
FIGS. 5A through 5D are diagrams showing graphs illustrative of a process of evaluating a hypothetical transmission error based on a measured transmission error of another hypoid gear of still another type, determining the area of a region surrounded by a transmission error curve and the maximum allowable value for transmission errors, and drawing a dividing line for dividing the region at an area ratio with an acceptance percentage of 100%.
Figure 5B:
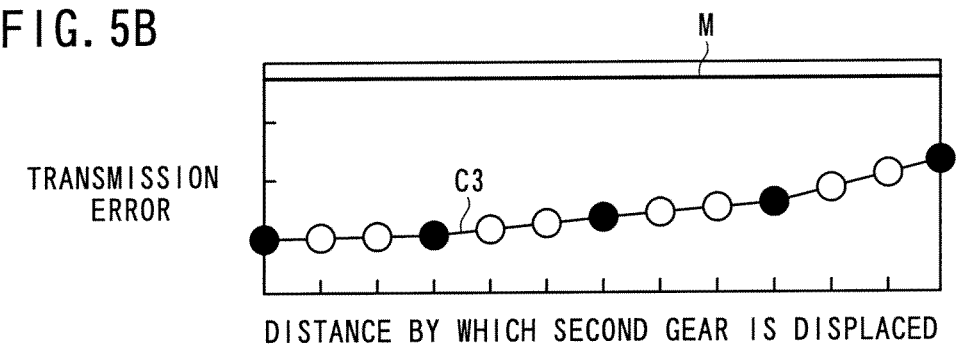
Figure 5C:
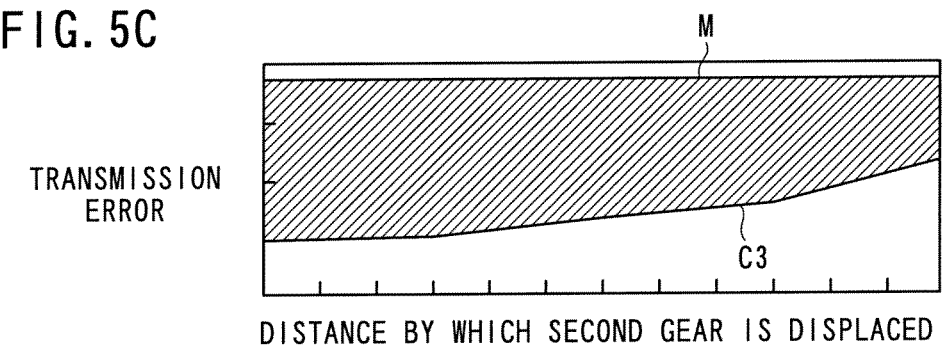

FIG. 5A shows transmission errors measured of a hypoid gear of still another type. As shown in FIG. 5B, hypothetical transmission errors are evaluated. Then, as shown in FIG. 5C, the area of a region surrounded by a transmission error curve C3 and the straight line M (the maximum allowable value for the transmission errors) is determined.

Figure 5D:
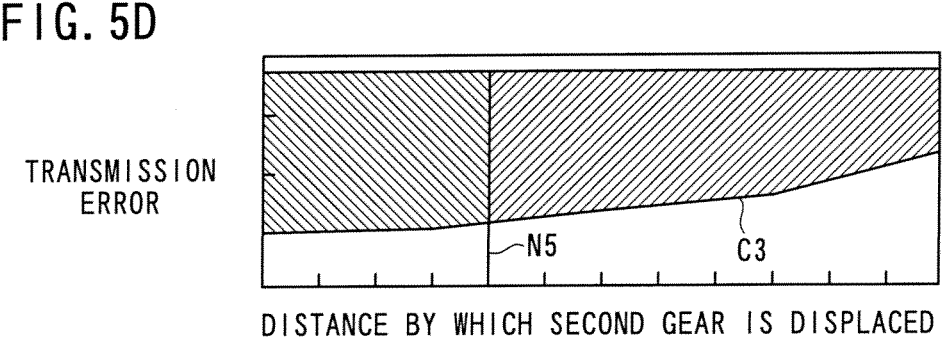

Then, in the same manner as described above, various dividing lines are drawn from the straight line M to the horizontal axis to divide the region at certain area ratios, and hypoid gears 10 are set up with the coordinates along the horizontal axis of the points of intersection between the dividing lines and the horizontal axis being regarded as indicating the meshing positions where the first gear 12 and the second gear 14 mesh with each other. Subsequently, acceptance percentages of the hypoid gears thus set up are determined. In FIG. 5D, a dividing line N5 is drawn at the meshing position for an acceptance percentage of 100%, and the area ratio of the sections produced with the dividing line N5 is 70:30.

As described above, it is possible to establish appropriate meshing positions of hypoid gears of other types in a similar fashion.

The invention claimed is:

1. A method of adjusting a meshing position of a hypoid gear including a first gear and a second gear which meshes with the first gear for transmitting a rotary motion of the first gear in a direction which is different from a direction along which a rotational shaft of the first gear extends, comprising the steps of:

displacing the second gear along a direction of a rotational shaft of the second gear a plurality of times while the second gear is being held in mesh with the first gear;

measuring transmission errors at respective positions to which the second gear is displaced and plotting a relationship between distances by which the second gear is displaced and the measured transmission errors;

evaluating hypothetical transmission errors between the measured transmission errors from the measured transmission errors;

subtracting the measured transmission errors and the hypothetical transmission errors from a maximum allowable transmission error to determine differences therebetween;

integrating the differences with respect to the distances by which the second gear is displaced, to determine the area of a region surrounded by the differences and the maximum allowable transmission error; and dividing the region with a dividing line at a given area ratio and establishing a point of intersection between the dividing line and the distances by which the second gear is displaced as a meshing position of the second gear.

2. A method of adjusting the meshing position of the hypoid gear according to claim 1, wherein points of intersection between dividing lines with which the region is divided at various area ratios and the distances by which the second gear is displaced, are regarded as meshing positions of the second gear to set up a plurality of hypoid gears, the hypoid gears are judged for acceptance percentages, and the area ratio for an acceptance percentage of 90% or higher is determined and regarded as the given area ratio to establish the meshing position of the second gear.

3. A method of adjusting the meshing position of the hypoid gear according to claim 2, wherein the area ratio for the acceptance percentage of 90% or higher is determined while the hypoid gear is in actual usage conditions.

* * * * *